INVENTOR.
Wladimir A. Reichel
BY
Cerstvik + Kalman
ATTORNEYS.

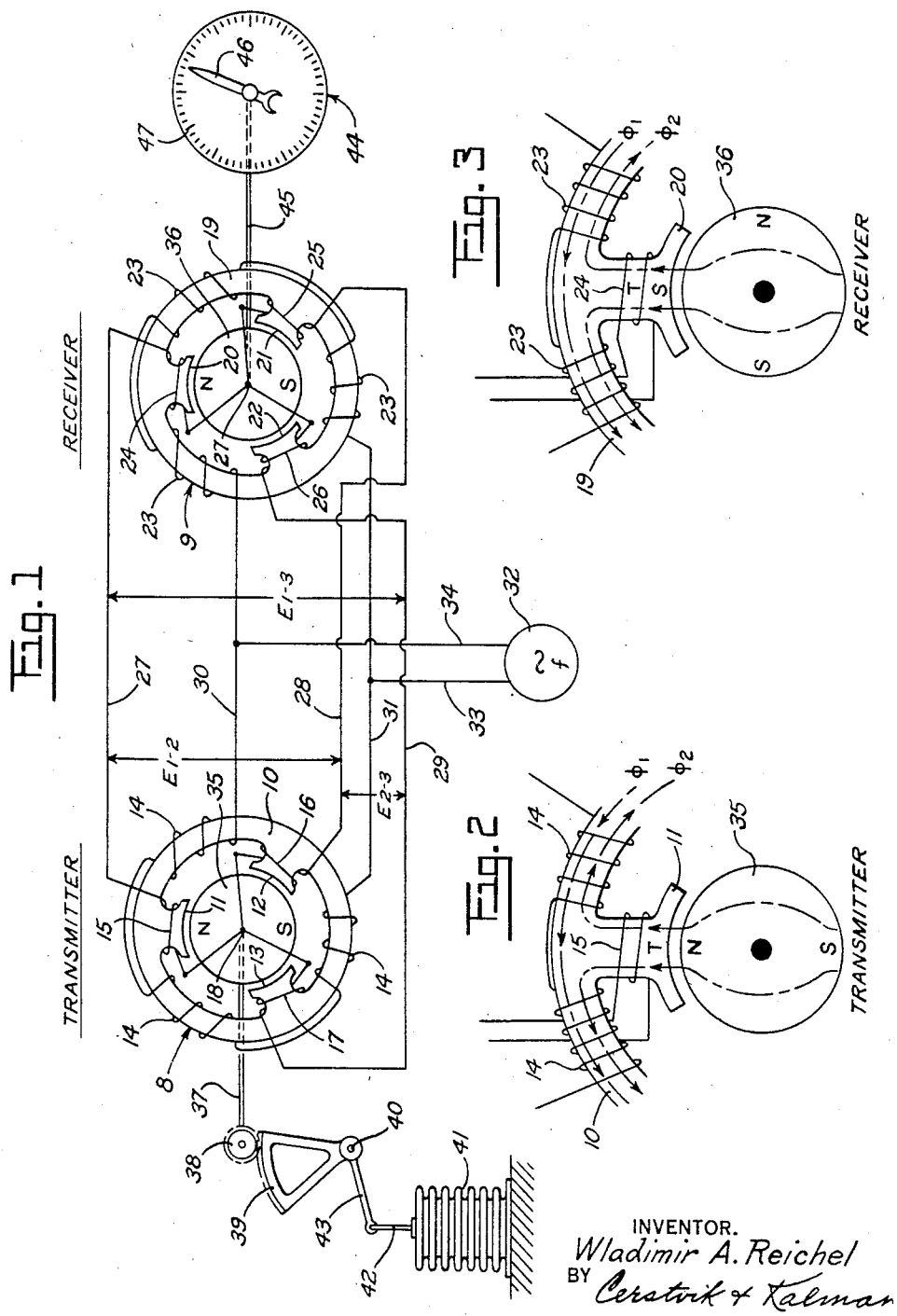

Patented Jan. 13, 1942

2,269,602

UNITED STATES PATENT OFFICE 2,269,602

MEANS FOR REPRODUCING MOTION

Wladimir A. Reichel, Bellerose, N. Y., assignor to Bendix Aviation Corporation, Bendix, N. J., a corporation of Delaware Continuation of application Serial No. 259,489, March 2, 1939. This application July 10, 1940, Serial No. 344,795

15 Claims. (Cl. 172—239)

This application is a continuation of my application, Serial No. 259,489, filed March 2, 1939, and the invention relates to means for reproducing motion and more particularly to novel means for reproducing motion at a remote point.

The invention is particularly adapted for remote indication, i. e. for measuring the value of a factor at one point and indicating that value at another point remote from the first point, but the invention may also be used for remote control of objects if so desired.

Accordingly, one of the objects of the present invention is to provide novel means for reproducing motion.

Another object is to provide novel means for reproducing motion at a remote point.

Another object of the invention is to provide a novel remote control system whereby an object at one point may be controlled from another and remote point.

Still another object is to provide a novel remote indicating system.

A further object of the invention is to provide a novel system for measuring the value of a factor at one point and for indicating that value at another and remote point.

A still further object is to provide a novel electrical system for reproducing motion at a remote point and embodying two similar electromagnetic devices one of which is a transmitter, and the other a receiver, and each of which comprises a stator and a rotor having no brushes, slip rings or commutators of any kind.

A still further object of the invention is to provide a novel combination comprising a measuring instrument at one point, an indicator at another and remote point, a stationary polyphase winding at the measuring instrument, a stationary single-phase winding associated with said polyphase winding, a similar stationary polyphase winding at the remote indicator and electrically connected to the first-mentioned polyphase winding, a stationary single-phase winding associated with said second-mentioned polyphase winding, a source of alternating current for energizing one of the windings at the measuring instrument and a corresponding one of the windings at the indicator, a poled rotatable magnet at the measuring instrument and drivably connected thereto for actuation thereby, and a similar poled rotatable magnet at the indicator and drivably connected thereto for actuating the same and in influencing ration with the windings at said indicator for actuation by the reaction between its own field and the field produced by said last-mentioned windings.

Finally, another object of the invention is to provide a novel electromagnetic device adapted for use as a transmitter or receiver and arranged for connection to a similar device functioning respectively as a receiver or transmitter, said device comprising a stator having a polyphase winding and a single-phase winding, one of said windings being energized by an alternating current, and a poled rotatable magnet associated in magnetic relation with said windings.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for purposes of illustration and description only and are not intended as a definition of the limits of the invention, reference being primarily had for this purpose to the appended claims.

In the drawings, wherein like reference characters refer to like parts, throughout the several views;

Fig. 1 is a more or less diagrammatic illustration of one form of apparatus embodying the invention as applied to the production of a remote indication by an altimeter, for example, and shows a transmitter and receiver with their magnetic and electric circuits and connections;

Fig. 2 is a diagrammatic view of a portion of the transmitter shown in Fig. 1;

Fig. 3 is a diagrammatic view of a corresponding portion of the receiver shown in Fig. 1;

Figure 4:
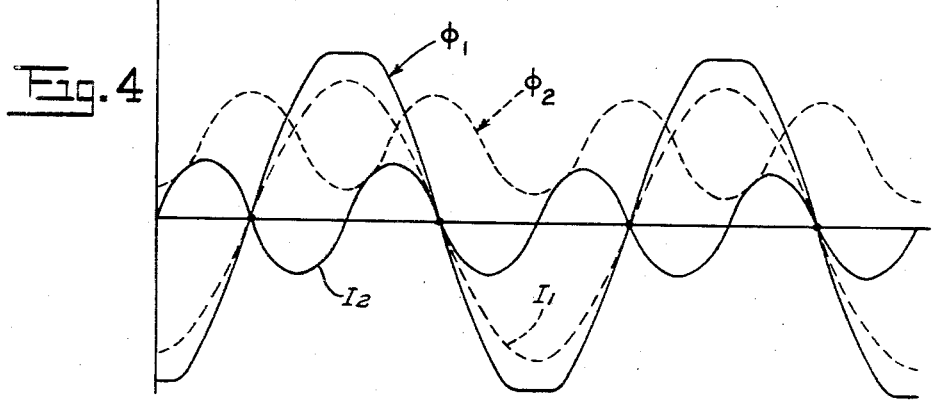
Fig. 4 is an explanatory diagram of curves showing the relation of the magnetic fluxes and the voltage and current in the transmitter.
Figure 5:
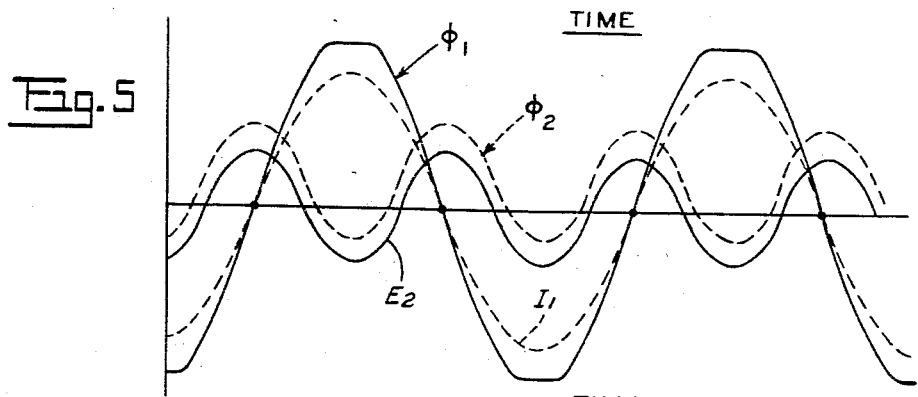
Fig. 5 is an explanatory diagram of curves showing the relation of the magnetic fluxes and the currents in the receiver.

Referring now to the drawings and more particularly to Fig. 1, the novel apparatus embodying the invention comprises, in the form shown, a transmitter 8 and a remote receiver 9 electrically connected to said transmitter in a manner which will be explained more fully hereinafter.

The transmitter comprises, as shown, a stator 10 in the form of an annulus or ring highly permeable magnetic material such, for example, as "Permalloy," providing a core having a plurality of pole pieces 11, 12 and 13 on the inner periphery thereof and, in the present instance, angularly spaced 120° apart along the periphery of said core. On the annular or rim portion of the core of said stator 10 is a single-phase winding 14 which is wound on the portions of the ring between adjacent pole pieces. Three windings 15, 16 and 17 are wound on the pole pieces 11, 12 and 13, respectively, of the core of the stator 10 and are connected in three-phase relation at the junction 18 to form a Y-connected three-phase winding.

The receiver, which is at the remote point and is substantially similar or identical to the transmitter, likewise comprises a stator 19 in the form of an annulus or ring of highly permeable magnetic material such as "Permalloy," providing a core having a plurality of pole pieces 20, 21 and 22, respectively, on the inner periphery thereof and also angularly spaced 120° apart along the periphery of said core as in the case of the transmitter. On the annular or rim portion of the core of said stator 19 is a single-phase winding 23 which is wound on the portions of the ring 19 between adjacent pole pieces. Three windings 24, 25 and 26 are wound on the pole pieces 20, 21 and 22, respectively, of the core of said stator 19 and are likewise connected in three-phase relation at the junction 27 to form a Y-connected three-phase winding as in the case of the three windings 15, 16 and 17 of the transmitter.

The ends of the three-phase winding 15, 16 and 17 of the stator 10 of the transmitter are respectively connected to the ends of the three-phase winding 24, 25 and 26 of the stator 19 of the receiver by means of leads 27, 28 and 29, respectively, while the single-phase winding 14 on the core 10 of the transmitter is connected to the corresponding single-phase winding 23 on the core 19 of the receiver by means of leads 30 and 31, and these windings 14 and 23 are both energized by a suitable alternating current of a frequency $f$ supplied from a suitable source 32 connected to the leads 30 and 31 by means of leads 33 and 34. The alternating current source 32 may be an alternating current generator, alternator or a vacuum tube oscillator, for example.

Concentrically arranged within the stator core 10 of the transmitter and cooperating with the pole pieces 11, 12, and 13 is a rotor 35 in the form of a magnetic member of marked polarity as, for example, a rotatable permanent magnet having north and south poles as indicated at N and S, providing a uni-directional magnetic field. The rotor magnet 35, in the present instance, is shown in the form of a disc the upper half of which constitutes the north pole and the lower half the south pole thereof.

At the receiver there is likewise provided a rotor 36 substantially identical to the rotor 35 of the transmitter and arranged concentrically within the stator core 19 of the receiver for cooperation with the pole pieces 20, 21 and 22.

Means are now provided for rotating the rotor 35 in accordance with the factor to be measured and to be indicated at the remote point by the receiver in a manner which will be explained more fully hereinafter. Such means comprise, in the present instance, a drive shaft 37 having one end connected to the rotor 35 and carrying at its other end a pinion 38 meshing with a gear sector 39 which is pivoted at 40, the gear sector 39 being connected to a measuring instrument such, for example, as an evacuated bellows or aneroid 41 by means of a link 42 and a lever 43. Thus, upon expansion and contraction of the evacuated bellows or aneroid 41, the gear sector 39 is actuated on its pivot 40 and thereby drives the pinion 38 to rotate the magnet rotor 35 in a direction and amount corresponding to the direction and amount of movement of the evacuated bellows or aneroid 41.

The rotor magnet 36 of the receiver is drivably connected to an indicator 44 in any suitable manner as by means of a shaft 45 one end of which is connected to the rotor magnet 36 and the other end of which is connected to a pointer 46 which cooperates with a scale 47 of the indicator 44.

Referring now to Fig. 2, which shows a portion of the magnetic circuit of the transmitter shown in Fig. 1, it will be seen that the single-phase winding 14 which is energized by alternating current from source 32 will produce a flux $\phi_1$ in the ring 10, which is first in the direction shown by the arrow and then reverses so that a periodic reversal of the flux $\phi_1$ takes place at a frequency corresponding to the frequency $f$ of the alternating current from source 32. The rotor magnet 35, when in the position shown in Fig. 2, sends a flux $\phi_2$ through the pole piece 11 and ring 10 of the stator in the directions shown by the arrow, i. e. this flux $\phi_2$, after entering the pole piece 11, flows in two directions, namely, a portion going to the left and a portion going to the right, as viewed in Fig. 2.

Figure 7:
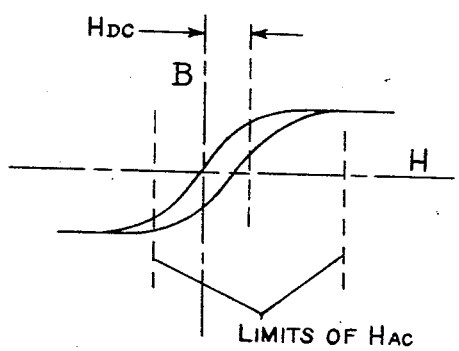
Fig. 7 is a magnetization curve of the core of the transmitter.

The flux $\phi_1$ produced by the alternating current from source 32 varies in such a manner that it is sufficient in amplitude to saturate portions of the ring 10 during a part of the cycle, as shown in Fig. 7, i. e. when $\phi_1$ and $\phi_2$ are in the same direction. Fig. 4 of the drawings shows the variation of the exciting current $I_1$ of fundamental frequency supplied to the winding 14 from the source 32 and also the variation of the fluxes $\phi_1$ and $\phi_2$ which vary with the change of the reluctance of the magnetic circuit provided by the ring core member 10 of the stator. As a result of the changes in the flux $\phi_2$ there is generated a second harmonic voltage $E_2$ in winding 15 around the pole piece 11. In the same manner second harmonic voltages are generated in the windings 16 and 17 which are wound around the pole pieces 12 and 13, respectively.

Figure 6:
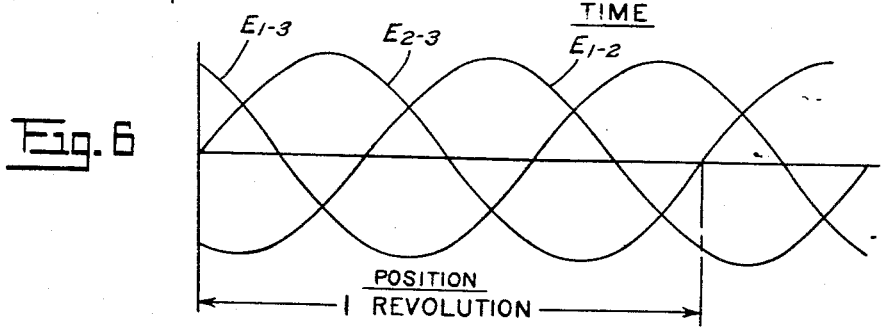
Fig. 6 is an explanatory diagram of curves showing the relation of the voltages in the three-phase windings of the transmitter and receiver.

In Fig. 6 are shown the values of the voltages of each of the phases formed by the three-phase connection of the windings 15, 16 and 17 at the junction 18, the voltage of the phase between windings 15 and 16 being designated as $E_{1-2}$, the voltage between the windings 16 and 17 as $E_{2-3}$, and the voltage of the phase between the windings 15 and 17 as $E_{1-3}$. These second harmonic voltages are in phase and vary only in amplitude with the position of the magnet rotor 35 with respect to the respective pole pieces 11, 12 and 13 carrying the windings 15, 16 and 17, respectively.

When the magnet rotor 36 of the receiver is in the same position as the magnet rotor 35 of the transmitter, as shown in Fig. 1, i. e., when the rotors 35 and 36 are in step, the same action takes place in the ring core member 19 and windings 24, 25 and 26 as in ring core member 10 and windings 15, 16 and 17 so that second harmonic voltages are produced in the three-phase connected windings 24, 25 and 26, which are equal to the second harmonic voltages produced in the windings 15, 16 and 17 but are in an opposite direction, and as a result there is no current flow in the connecting leads 27, 28 and 29 by which the windings 15, 16 and 17 of the transmitter are connected to the windings 24, 25 and 26 of the receiver. If, however, the magnet rotor 35 is displaced, the secondary voltages of the windings 15, 16 and 17 will no longer be equal, and currents will flow in the leads 27, 28, and 29, thereby producing a torque at the receiver and bringing the magnet rotor 36 in step with the magnet rotor 35 of the transmitter in a manner which will now be explained with reference to Fig. 3.

In Fig. 3 is shown a portion of the magnetic circuit of the receiver shown in Fig. 1 and corresponding to the portion of the magnetic circuit of the transmitter previously described with reference to Fig. 2, except that the magnet rotor 36 is now in a position different than the magnet rotor 35 of the transmitter and represents a relative displacement between the two rotors as by angularly moving the magnet rotor 35 of the transmitter so as to bring it out of step with the rotor magnet 36 of the receiver. Thus, in the position of the magnet rotor 36 shown in Fig. 3 there is no flux supplied by the rotor magnet to the pole piece 20 and hence there is no voltage in the winding 24 to balance the voltage introduced therein by the winding 15 connected thereto. Consequently, a second harmonic current $I_2$ flows in winding 24 setting up a flux $\phi_2$ through pole piece 20 and the ring core 19 of the stator of the receiver. The winding 23 being supplied with the same alternating current $I_1$ of fundamental frequency, produces a flux $\phi_1$ to saturate portions of the ring core member 19 during a part of the cycle.

Fig. 4 shows the exciting current $I_1$ of fundamental frequency, the flux $\phi_1$, and the flux $\phi_2$ produced by the second harmonic current $I_2$. It will be noted that during one-half of every cycle of the second harmonic current $I_2$, the ring core member 19 is saturated and as a result very little of the flux $\phi_2$ flows, but that during the other half cycle of the second harmonic current $I_2$, the ring core member 19 is not saturated and a considerable amount of the flux $\phi_2$ flows. As a result, the time average of flux $\phi_2$ in the ring core member 19 of the stator of the receiver is not zero but is positive as shown by the dash line in Fig. 4. This flux $\phi_2$ sets up an average south pole in the pole piece 20 as indicated by S in Fig. 3. This south pole then attracts the north pole N of the rotor magnet 36, setting up the torque which brings the magnet rotor 36 into step with the magnet rotor 35 of the transmitter.

From the foregoing, it will be seen that if the magnet rotor 35 of the transmitter (Fig. 1) is rotated by the shaft 37 in response to the expansion or contraction of the aneroid 41, second harmonic currents will flow from the windings 15, 16 and 17, to the windings 24, 25 and 26, respectively, of the receiver, and these second harmonic currents will then produce a pulsating uni-directional flux in the ring core member 19, the average value of which is such as to produce a uni-directional field having a direction corresponding to the direction of the uni-directional field of the magnet rotor 35 of the transmitter in its displaced position. This uni-directional field will then react with the field of the magnet rotor 36 of the receiver to cause rotation of said magnet rotor and this rotation is then imparted to the pointer 46 of the indicator 44 by the connecting shaft 45. The indication of the pointer 46 with respect to the scale 47 will correspond to the value measured by the aneroid 41 and transmitted by the transmitter 8.

The theory of operation of the apparatus and system is as follows:

The exciting alternating current $I_1$ of fundamental frequency is provided by the source 32, while the magnet rotor 35 produces a uni-directional flux $\phi_2$ in the magnetic circuit formed by the ring core member 10 of the transmitter. The direction of this uni-directional flux $\phi_2$ is angularly varied by rotating said magnet rotor in accordance with the expansion and contraction of the aneroid 41. Upon this uni-directional flux produced in the core member 10 by the magnet rotor 35 is superimposed an alternating flux $\phi_1$ by means of the alternating current $I_1$ supplied to the winding 14 from source 32, thus periodically varying the reluctance of the magnetic circuit as, for example, by periodically saturating the same and, hence, periodically varying the uni-directional flux produced by the magnet rotor 35. As a result of the variation of the uni-directional flux $\phi_2$, there is induced in each of the windings 15, 16 and 17 an alternating current $I_2$, which is the second harmonic of the exciting current $I_1$, flowing in the winding 14. This second harmonic current $I_2$ is transmitted to the receiver 9 at the remote point and produces in the magnetic circuit of the ring core member 19 an alternating flux upon which is superimposed another alternating flux of fundamental frequency by means of the winding 23 which is energized from the source 32, whereby the alternating second harmonic flux produced by the windings 24, 25 and 26, is, in effect, rectified to produce a pulsating uni-directional flux the average value of which is such as to produce a uni-directional field having a direction corresponding to the direction of the uni-directional flux produced by the magnet rotor 35 at the transmitter in the position to which it has been displaced by the operation of the aneroid 41 (as shown in Fig. 3). This uni-directional field reacts with the uni-directional field of the magnet rotor 36 to produce a torque which produces rotation of said magnet rotor 36, thereby actuating the pointer 46 the scale 47 of the indicator 44.

As previously pointed out, the indicator 44 may be replaced by any object which it is desired to control from a remote point. For example, the indicator 44 may be a gun turret controlled from a remote point at which the transmitter may be located, and the transmitter may be actuated manually, i. e., the magnet rotor 35 may be rotated by hand to a desired position, whereby the gun turret will be operated by the receiver and move angularly into a position corresponding to the position to which the magnet rotor 35 of the transmitter was moved.

From the foregoing, it will be seen that there is thus provided novel means for reproducing motion, and particularly for reproducing motion at a remote point, and also a novel system for measuring the value of a factor at one point, as at the transmitter, and for indicating that value at another and remote point, as at the receiver. There is also provided a novel electro-magnetic device adapted for use as a transmitter or receiver and arranged for connection to a similar device functioning respectively as a receiver or transmitter, and comprising a stator having a polyphase winding and a single-phase winding, one of the windings being energized by an alternating current, and a poled rotatable magnet associated in magnetic relation with the two windings.

Although only one embodiment of the invention has been illustrated and described, various changes and modifications in the form and relative arrangement of the parts and circuits, which will now appear to those skilled in the art, may be made without departing from the scope of the invention.

For example, instead of the three poles 11, 12 and 13 and the three windings 15, 16 and 17 used in the transmitter, four or five poles and four or five associated windings may be used, and in such event a corresponding number of poles and windings would be provided at the receiver.

Reference is, therefore, to be had to the appended claims for a definition of the limits of the invention.

What is claimed is:

1. An electromagnetic device adapted for use as a transmitter or receiver and arranged for electrical connection to a similar device functioning respectively as a receiver or transmitter, said device comprising a stator having a three-phase winding and a single-phase winding, one of said windings being energized by an alternating current, and a poled rotatable magnet associated in magnetic relation with said windings.

2. An electromagnetic device adapted for use as a transmitter or receiver and arranged for electrical connection to a similar device functioning respectively as a receiver or transmitter, said device comprising a stator having a polyphase winding and a single-phase winding, one of said windings being energized by an alternating current, and a poled rotatable magnet associated in magnetic relation with said windings.

3. Means for repeating angular movements comprising in combination with a controlling object and a remote driven object, a transmitting device connected to said controlling object and a receiving device connected to said driven object, said transmitting and receiving devices being similar and each comprising a closed core member of permeable magnetic material, a polyphase winding on each core member, the winding of one core member being electrically connected in corresponding phase relation to the winding on the other core member, a single-phase winding on each of said core members, a source of alternating current connected to said single-phase windings for energizing them to vary the reluctance of the magnetic paths in said core members, and a rotatable magnet at each core member and mounted coaxially and in magnetic relation therewith, the one magnet being drivably connected to said controlling object and the other being drivably connected to said driven object whereby, upon angular movement of the one magnet by the controlling object, a current is caused to flow from the polyphase winding of the transmitting device to the polyphase winding of the receiving device to produce a uni-directional magnetic field at the latter winding, the direction of said field being such as to cause the magnet at the receiving device to move angularly into a position corresponding to the position of the magnet at the transmitting device, thereby angularly moving the driven object an amount and in a direction corresponding to the amount and direction of angular movement of the controlling object.

4. Means for repeating angular movements comprising in combination with a controlling object and a remote driven object, a transmitting device connected to said controlling object and a receiving device connected to said driven object, said transmitting and receiving devices being similar and each comprising a closed core member of permeable magnetic material, a three-phase winding on each core member, the winding of one core member being electrically connected in corresponding phase relation to the winding on the other core member, a single-phase winding on each of said core members, a source of alternating current connected to said single-phase windings for energizing them to vary the reluctance of the magnetic paths in said core members, and a rotatable magnet at each core member and mounted coaxially and in magnetic relation therewith, the one magnet being drivably connected to said controlling object and the other being drivably connected to said driven object whereby, upon angular movement of the one magnet by the controlling object, a current is caused to flow from the three-phase winding of the transmitting device to the three-phase winding of the receiving device to produce a uni-directional magnetic field at the latter winding, the direction of said field being such as to cause the magnet at the receiving device to move angularly into a position corresponding to the position of the magnet at the transmitting device, thereby angularly moving the driven object an amount and in a direction corresponding to the amount and direction of angular movement of the controlling object.

5. Means for repeating angular movements comprising, in combination with a controlling object and a driven object, a transmitting device connected to said controlling object and a receiving device connected to said driven object, said transmitting and receiving device being similar and each comprising a stator having a polyphase winding and a single-phase winding, the polyphase windings of the two devices being electrically connected together in corresponding phase relation, a source of alternating current connected to a corresponding one of the windings of each device, and a rotatable magnet at each stator and mounted in magnetic relation therewith, the one magnet being connected to said controlling object and the other magnet being drivably connected to said driven object.

6. In combination, a transmitter at one point and a receiver at another and remote point, a stationary polyphase winding at the transmitter, a stationary single-phase winding associated with said polyphase winding, a rotatable magnet in influencing relation with said windings, a similar stationary polyphase winding at the remote receiver and electrically connected to the first-mentioned polyphase winding in corresponding phase relation, a stationary single-phase winding associated with said second-mentioned polyphase winding, a source of alternating current for energizing one of the windings at the transmitter and a corresponding one of the windings at the receiver, and a rotatable magnet at the receiver and associated with the windings thereof for actuation by the reaction between its own field and the field produced by the windings of said receiver upon rotation of the magnet at the transmitter.

7. An electromagnetic device adapted for use as a transmitter or receiver and arranged for electrical connection to a similar device functioning respectively as a receiver or transmitter, said device comprising a stator having a polyphase winding and a single phase winding, one of said windings being energized by a periodically varying current, and a poled magnet associated in magnetic relation with said windings.

8. An electromagnetic device adapted for use as a transmitter or receiver and arranged for electrical connection to a similar device functioning respectively as a receiver or transmitter, said device comprising a stator including an annular closed core of magnetically permeable material, coil means on said core and provided with a polyphase connection for connecting one part of said coil means to a corresponding part of the coil means of a similar device and also provided with connections for energizing another part of said coil means by a periodically varying electric current, and a rotor comprising a poled magnet associated in magnetic relation with said core and coil means.

9. An electromagnetic device adapted for use as a transmitter or receiver and arranged for electrical connection to a similar device functioning respectively as a receiver or transmitter, said device comprising a stator including an annular closed core member of magnetically permeable material, coil means on said core and provided with a polyphase connection for connecting one part of said coil means to a corresponding part of the coil means of a similar device and also provided with a single phase connection for energizing another part of said coil means by a single phase alternating current, and a rotor comprising a poled magnet associated in magnetic relation with said core and said coil means.

10. Means for transmitting angular movements from one point to another point, comprising a first relatively stationary annular core of magnetically permeable material at the first point, a polyphase winding and a single phase winding on said core, a rotatable magnet adjacent said core and mounted for rotation about the axis of said core, a second relatively stationary annular core of magnetically permeable material at the other point, a polyphase winding and a single phase winding on said second core, a rotatable magnet adjacent said second core and mounted for rotation about the axis of said second core, means electrically connecting the polyphase windings of the two cores, means electrically connecting the single phase windings of the two cores, and a source of periodically varying current connected to a corresponding winding of each core whereby, upon rotatiton of the magnet at the first core, the magnet at the second core is correspondingly rotated.

11. In combination, a transmitter comprising a first core member of magnetically permeable material, coil means on said first core member, having polyphase connections and a single phase connection, a rotatable magnet in influencing relation with said core member for inducing a magnetic flux therein, a receiver comprising a second core member of magnetically permeable material, coil means on said second core member and also having polyphase connections and a single phase connection, the polyphase connections of the first coil means being electrically connected to the polyphase connections of the second coil means in corresponding phase relation, a source of periodically varying current connected to the single phase connection of both of said coil means, and a rotatable magnet associated with the coil means of the second core member for actuation by the reaction between its own field and the field produced by the coil means of the second core member upon rotation of the magnet at the transmitter.

12. An electromagnetic device adapted for use as a transmitter or receiver, comprising a stator including a core of magnetically permeable material, coil means on said core and having a polyphase part and a single phase part, one of said parts being arranged for energization by a periodically varying current, and a rotor comprising a poled magnet associated in magnetic relation with said core and coil means.

13. An electromagnetic device adapted for use as a transmitter or receiver, comprising a stator including a core of magnetically permeable material, coil means on said core and having a polyphase part and a single phase part, said single phase part being arranged for energization by an alternating current, and a rotor comprising a poled magnet associated in magnetic relation with said core and coil means.

14. In combination, a transmitter comprising first core means of magnetically permeable material, coil means on said first core means, having polyphase connections and a single phase connection, a rotatable magnet in influencing relation with said core means for inducing a magnetic flux therein, a receiver comprising second core means of magnetically permeable material, coil means on said second core means and also having polyphase connections and a single phase connection, the polyphase connections of the first coil means being electrically connected to the polyphase connections of the second coil means in corresponding phase relation, a source of periodically varying current connected to the single phase connection of both of said coil means, and a rotatable magnet associated with the coil means of said second core means for actuation by the reaction between its own field and the field produced by the coil means of said second core means upon rotation of the magnet at the transmitter.

15. An electromagnetic transmitter comprising relatively stationary core means of magnetically permeable material, coil means on said core means and having polyphase connections and a single phase connection, certain of said connections being arranged for connection to a source of periodically varying current, and a rotatable magnet associated in magnetic relation with said core and coil means.

WLADIMIR A. REICHEL.